United States Patent [19]
Bellis, Jr.

[11] Patent Number: 6,145,855
[45] Date of Patent: Nov. 14, 2000

[54] CONVERTIBLE SULKY

[75] Inventor: William B. Bellis, Jr., Louisville, Ky.

[73] Assignee: Trimmer Trap, Inc., Louisville, Ky.

[21] Appl. No.: 09/474,383

[22] Filed: Dec. 29, 1999

Related U.S. Application Data

[60] Provisional application No. 60/141,186, Jun. 25, 1999.

[51] Int. Cl.[7] .................................................. B62D 63/00
[52] U.S. Cl. ............................ 280/32.7; 280/63; 280/492
[58] Field of Search ........................... 280/32.7, 63, 492,
280/493, 494, 87.01, 87.041, 204, 78, 64,
460.1, 461.1; 56/14.7, 15.5, 15.7, 15.9;
172/433; 180/14.1

[56] References Cited

U.S. PATENT DOCUMENTS

| | | |
|---|---|---|
| 1,334,559 | 3/1920 | Schaumburg et al. . |
| 2,537,521 | 1/1951 | Forbes ........................................ 280/63 |
| 3,379,452 | 4/1968 | Torrisi ........................................ 280/63 |
| 3,434,739 | 3/1969 | Schoonover . |
| 3,498,639 | 3/1970 | Hawk . |
| 3,524,514 | 8/1970 | Kratzke . |
| 3,664,431 | 5/1972 | Tatianko et al. . |
| 3,669,469 | 6/1972 | Hartelius . |
| 3,731,946 | 5/1973 | Westcott . |
| 3,759,541 | 9/1973 | Peterson . |
| 3,834,726 | 9/1974 | Hobza . |
| 3,912,300 | 10/1975 | Bryan, Jr. . |
| 3,946,822 | 3/1976 | Dohse . |
| 4,010,507 | 3/1977 | Johnson . |
| 4,045,050 | 8/1977 | Hawk . |
| 4,079,955 | 3/1978 | Thorpe et al. . |
| 4,232,754 | 11/1980 | Corrigan et al. . |
| 4,263,977 | 4/1981 | Willett . |
| 4,353,572 | 10/1982 | McCain . |
| 4,444,409 | 4/1984 | Garrison . |
| 4,588,199 | 5/1986 | Fisher . |
| 4,664,403 | 5/1987 | Livingston . |
| 4,828,282 | 5/1989 | Pinto . |
| 4,876,846 | 10/1989 | Torras . |
| 5,004,251 | 4/1991 | Velke et al. . |
| 5,076,599 | 12/1991 | Lockett et al. . |
| 5,118,123 | 6/1992 | Betrock . |
| 5,388,850 | 2/1995 | Simone . |
| 5,413,364 | 5/1995 | Hafendorfer . |
| 5,564,721 | 10/1996 | Wians . |
| 5,575,140 | 11/1996 | Bermes et al. . |
| 5,697,623 | 12/1997 | Bermes et al. . |
| 5,810,371 | 9/1998 | Velke . |
| 5,813,679 | 9/1998 | Hobrath . |
| 5,842,707 | 12/1998 | Smith . |
| 5,882,020 | 3/1999 | Velke . |
| 5,909,887 | 6/1999 | Hobrath . |
| 5,947,505 | 9/1999 | Martin . |
| 5,964,358 | 10/1999 | Hafendorfer et al. . |
| 6,000,705 | 12/1999 | Velke ..................................... 280/32.7 |
| 6,062,582 | 5/2000 | Miller ..................................... 280/493 |

OTHER PUBLICATIONS

Turf Rider, Inc., "Stand up Sulky" Operator's Manual Turf Rider, Minnetonka, MN Prior to filing date of referenced appl'n.

Wright Manufacturing, Inc., "Literature Bag" Wright Manufacturing, Inc. 1991–4 Gaithersburg, MD US.

Jungle Jim's, "Jungle Wheels" Advertisement Jungle Jim's, Louisville, KY US Prior to filing date of ref'd appl'n.

Jungle Jim's, "Jungle Wheels" Advertisement Jungle Jim's, Louisville, KY US Prior to filing date of ref'd appl'n.

Velke, Velke Sulky Advertisement Wright Manufacturing, Gaithersburg, MD US 1996.

*Primary Examiner*—Brian L. Johnson
*Assistant Examiner*—Bryan Fischmann
*Attorney, Agent, or Firm*—Camoriano & Associates; Theresa Camoriano

[57] ABSTRACT

A sulky for transportation of an operator, attachable to a self-propelled vehicle, defines pivot axes, one of which is selectively lockable in order to preclude yaw motion. The sulky also includes caster wheels which are selectively lockable to permit or preclude free castering of said wheels. It also provides stops at the pivot axes for limiting the amount of pivot.

21 Claims, 7 Drawing Sheets

CONVERTIBLE SULKY

This application claims priority from Provisional Application Ser. No. 60/141,186 filed Jun. 25, 1999.

BACKGROUND OF THE INVENTION

The present invention relates to sulkies that mount behind a self-propelled lawn mower or other self-propelled vehicle. There are many different types of sulkies known in the art. These sulkies typically have a mounting plate or some other type of mounting bracket that mounts to the back of the vehicle, and there are linkages between the sulky and the mounting plate which permit the platform to shift relative to the vehicle. The following standard definitions will aid in the description of the types of relative motion between the platform and the vehicle:

1. Pitch motion means pivoting about a horizontal left-to-right axis.
2. Roll motion means pivoting about a horizontal front-to-back axis.
3. Yaw motion means pivoting about a vertical axis.

Some sulkies have linkages to the vehicle which permit them to pivot about three axes relative to the vehicle (pitch, roll and yaw motions) and some have linkages that only pivot about two axes (pitch and roll) and then the sulkies have caster wheels to accommodate yaw motion. If the platform is supported by only one wheel, it is not necessary for the linkage to permit roll motion. The linkages arrange the pivots in various orders and use various known mechanical mechanisms. There are advantages and disadvantages to both types of sulkies depending upon the type of terrain, the type of vehicle pulling the sulky, and the person's experience and preferences.

SUMMARY OF THE INVENTION

The preferred embodiment of the present invention provides a sulky that is convertible from a sulky with linkages that permit pitch and yaw and having wheels that do not caster to a sulky with linkages that restrict the yaw motion and have caster wheels. This design permits the user to take advantage of each type of sulky, depending upon the terrain, the type of vehicle being used, and the operator's preferences. Conversion of the sulky from one type to the other requires only minor adjustments and can be accomplished manually very quickly. The preferred embodiment of the present invention also limits the amount of rotation about each axis.

DESCRIPTION OF THE PREFERRED EMBODIMENT

Figure 1:
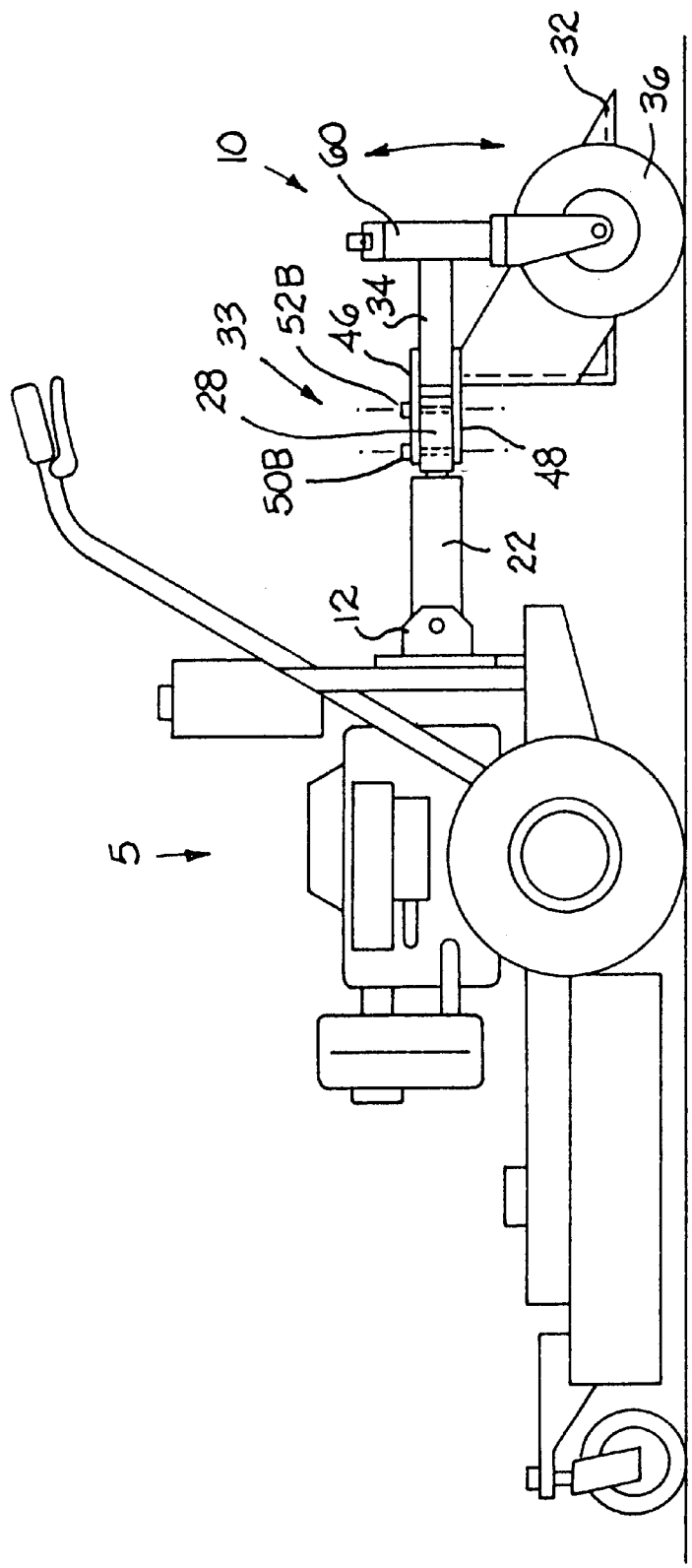
FIG. 1 is a side view of a convertible sulky made in accordance with the present invention, coupled to a self-propelled lawn mower.
Figure 2:
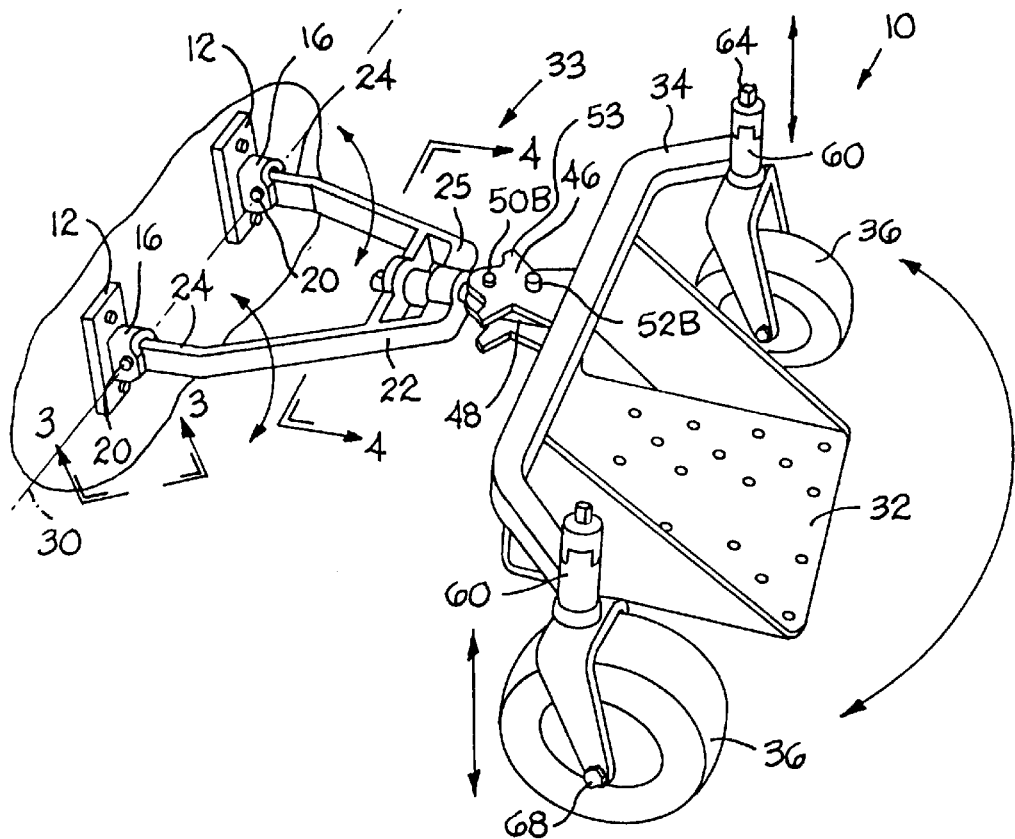
FIG. 2 is a perspective view of the convertible sulky of FIG. 1 mounted to the lawn mower, with the mower broken away.
Figure 3:
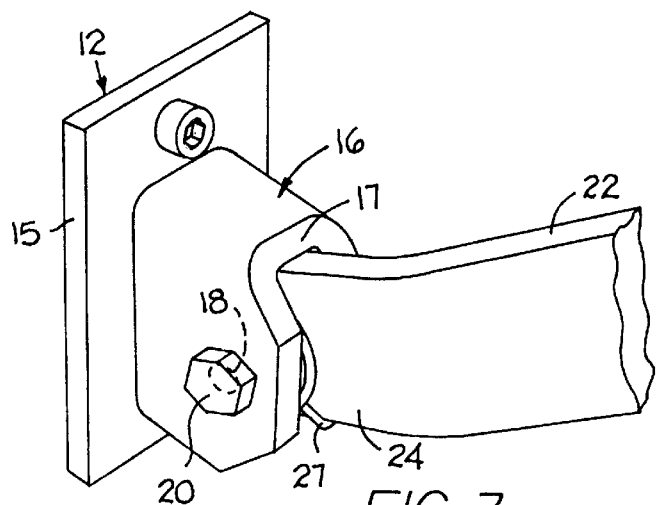
FIG. 3 is a view taken along the line 3—3 of FIG. 2 showing one of the brackets that mount the sulky to the mower to permit rotation about a left-to-right horizontal axis to provide pitch motion.
Figure 4:
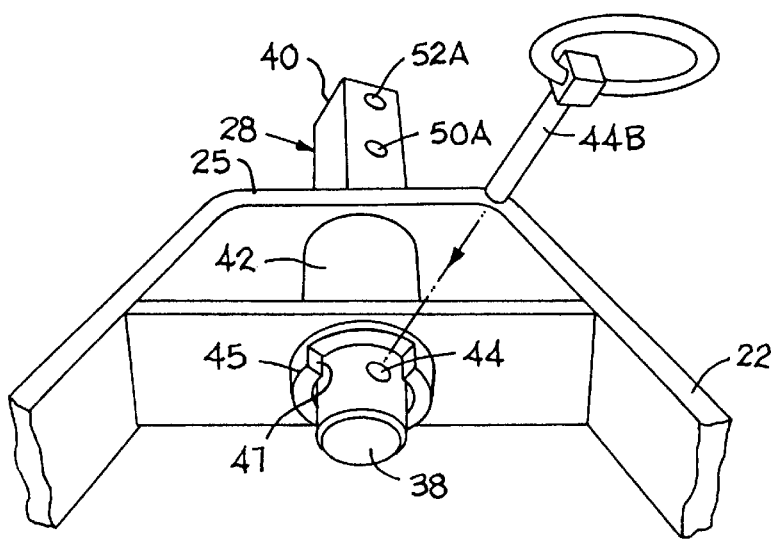
FIG. 4 is a view taken along the line 4—4 of FIG. 2, showing the members that permit rotation about a front-to-back horizontal axis, or roll motion.
Figure 5:
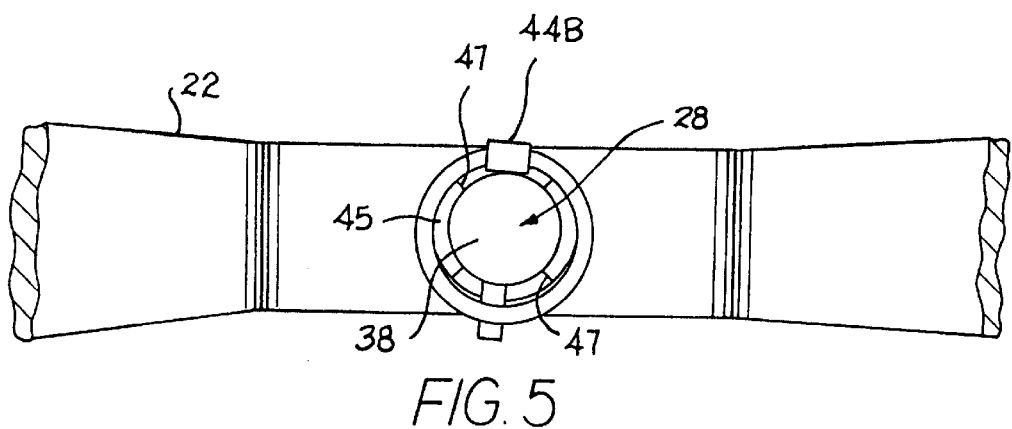
FIG. 5 is an enlarged view of the shaft and pin shown in FIG. 4.

FIGS. 1–14 show a first preferred embodiment of the present invention. FIGS. 1 and 2 show a sulky 10 that is designed to be mounted on the back of a mower or other self-propelled vehicle 5. The sulky 10 includes a platform 32, which is supported on two wheels 36, and it includes a linkage arrangement 33, which connects the platform 32 to the vehicle 5. The linkage arrangement 33 includes mounting brackets 12, a U-shaped mounting yoke or arm 22, a connecting shaft or coupler shaft 28, and a frame 34. The two L-shaped mower mounting brackets 12, shown best in FIGS. 2 and 3, are secured to the rear of the self-propelled vehicle by bolting, welding, or other known means. Each mounting bracket 12 includes one leg 15 that lies flat against the rear surface of the vehicle 5 and another leg 16, having an inverted U-shaped cross-section, which projects rearwardly and defines holes 18. The holes 18 of the left and right brackets 12 are aligned and receive bolts 20, that are used to mount the connecting arm 22 to the mounting bracket 12. The connecting arm 22, shown in FIGS. 2 and 4, is a substantially U-shaped yoke, including two vehicle mounting ends 24 and a central portion 25 that mounts to the coupler shaft 28. The vehicle mounting ends 24 of the connecting arm 22 define holes which are aligned with the respective hole 18 in the respective bracket 12, and the bolts 20 extend through the holes 18 in the projections 16 of the brackets 12 and through the respective holes in the mounting ends 24 of the connecting arm 22 to pivotably mount the connecting arm 22 on the mounting bracket 12. This permits the connecting arm 22 to pivot up and down (pitch motion) relative to the vehicle about a left-to-right horizontal axis 30. The fact that the pivot end 24 of the arm 22 is recessed in the projection 16 of the bracket 12 means that the bracket 12 creates a stop, limiting the amount of pitch. Once the connecting arm 22 rotates upwardly relative to the brackets 12 a certain distance, it will contact the upper wall 17 of the U-shaped legs 16, thereby limiting the pitch.

As shown in FIG. 3, one of the brackets 12 includes a torsion spring 27, which, when the platform 32 and its frame 34 are removed, provides sufficient force to lift up the arm 22 to a storage position.

As shown in FIGS. 1 and 2, the standing platform 32 of the sulky 10 is fixed to a frame 34, which is supported by two wheels 36. The front of the frame 34 is mounted to the connecting arm 22 through the coupler shaft 28, as shown in FIGS. 4–7. The coupler shaft 28 has a round cross-section in the forward portion 38, which mounts to the connecting arm 22, and it has a square cross-section in the rear portion 40, which mounts to the frame 34. There is a forward-to-rear directed tube 42 fixed on the central portion 25 of the connecting arm 22, which receives the round cross-section forward portion 38 of the coupler shaft 28. A vertical hole 44 in the round cross-section portion 38 of the coupler receives a linch-pin 44B, which retains the coupler shaft 28 on the connecting arm 22. A forward projection 45 of the tube 42 has two recesses 47 cut into its forward edge. The linch pin 44B lies in those recesses 47. As the connecting shaft 28 rotates about the front-to-back horizontal axis, in the roll direction, the linch-pin 44B will contact the sides of these recesses 47, thereby limiting the roll of the platform 32 relative to the mower 5.

As shown in FIGS. 1, 2, 6, and 14, on the front central portion of the sulky frame 34 are fixed parallel upper and lower mounting plates 46, 48, with vertically-aligned forward holes 50 in both plates and vertically-aligned rear holes 52 in both plates. The coupler shaft 28 defines corresponding vertical forward and rear holes 50A, 52A, which are aligned with the respective plate holes 50, 52. The front hole 50A of the coupler has a bearing 50C. A bolt 50B is received in the holes 50 of the upper and lower plates 46, 48 and in the bearing 50C to provide a pivot connection between the coupler 28 and the frame 34 about the vertical axis of the bolt 50B to provide yaw motion. The bolt 50B is secured by a nut 50E. Washers 50D located above and below the coupler shaft 28 adjacent the hole 50A keep the coupler properly aligned and prevent it from rubbing on the upper and lower plates 46, 48. Nubs 53 project outwardly from the upper mounting plate 46 and serve as stops to limit the amount of yaw motion when they contact the arm 22.

Figure 6:
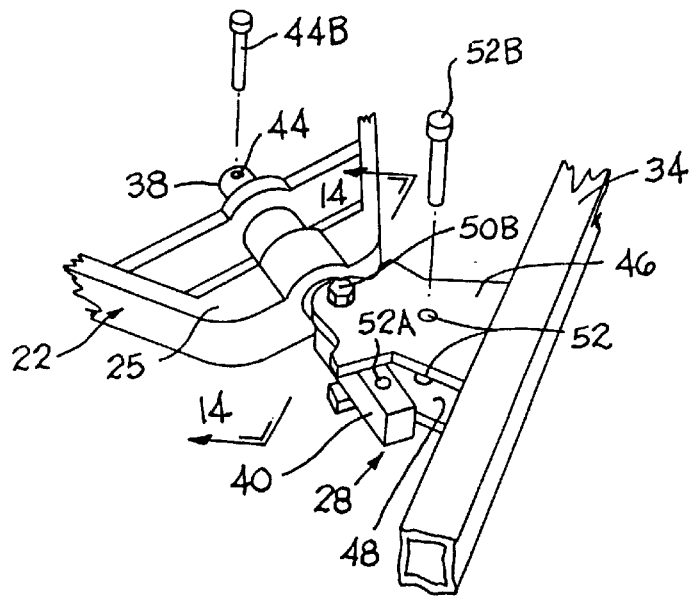
FIG. 6 is a perspective view of the portion of the mounting arrangement that permits rotation about a vertical axis, or yaw motion, and showing a pin, which, when inserted, prevents that rotation.
Figure 7:
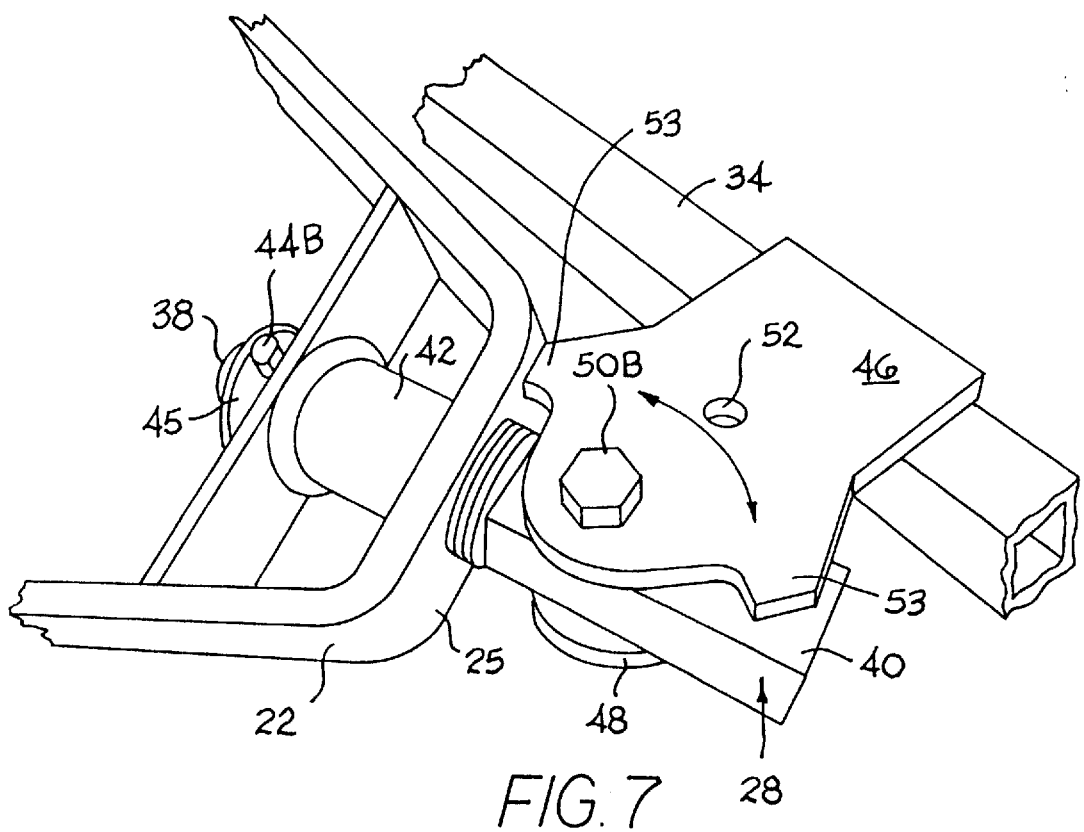
FIG. 7 shows the same elements as FIG. 6 and demonstrates the limit on the extent of yaw motion.
Figure 9:
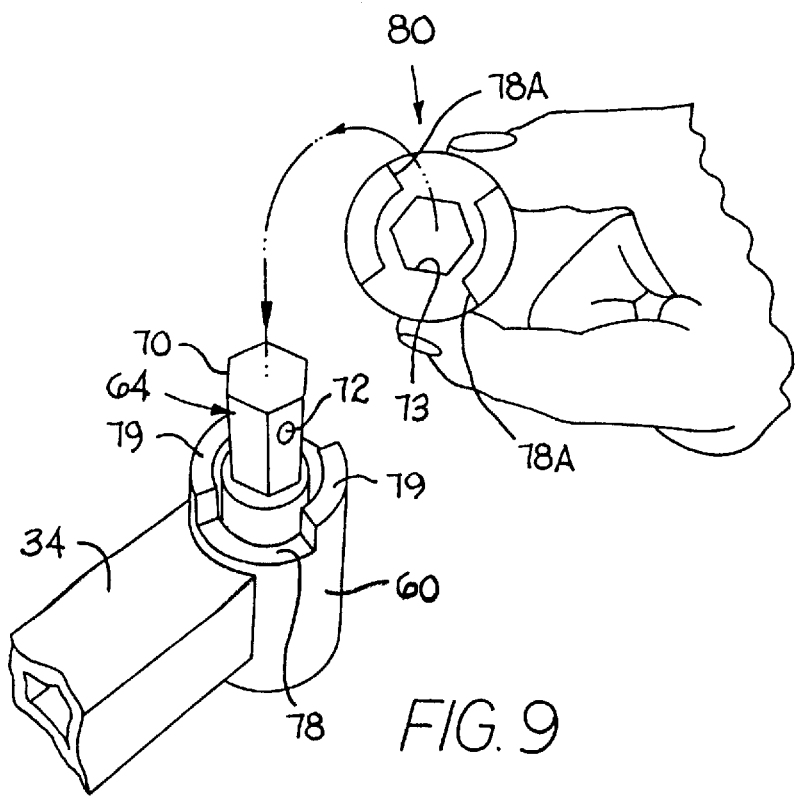
FIG. 9 is a perspective view of the top of the caster of FIG. 8, showing the collar which, when inserted in one direction, permits castering and, when inserted in the opposite direction prevents castering.

A removable locking pin 52B is received in the rear holes 52 of the upper and lower plates 46, 48 and in the rear hole 52A of the coupler shaft 28, as shown in FIGS. 1, 2, and 6. When the locking pin 52B is in position, as shown in phantom in FIG. 6, the standing platform 32 is prevented from pivoting about a vertical axis (yaw motion) relative to the lawn mower 5 through the linkage mechanism 33. When the locking pin 52B is removed, the standing platform 32 can pivot about the vertical axis of the forward bolt or pin 50B (yaw motion) until the nubs 53 contact the arm 22, as shown in FIG. 7. The nubs 53 have flat surfaces which contact the arm 22, so as to provide a large surface area for contact.

Thus, the connection between the connecting arm 22 and the mounting bracket 12 permits the standing platform 32 to pivot about a left-to-right axis relative to the vehicle (pitch motion) defined by the axis of the pins 20. The connection between the connecting arm 22 and the coupler shaft 28 permits the standing platform 32 to pivot about a front-to-rear axis relative to the vehicle (roll motion) defined by the axis of the shaft 28. And the connection between the coupler shaft 28 and the frame 34 may be locked, if the locking pin 52B is in place, or it may permit the standing platform 32 to pivot about a vertical axis relative to the vehicle (yaw motion), defined by the axis of the pin 50B, if the locking pin 52B is removed. Also, for each pivot connection, there is a mechanism limiting the extent of the pivot.

While this preferred embodiment provides one linkage mechanism that permits pitch, roll, and yaw motions, various other types of linkage mechanisms are known and could be used. The order of the pivoting could be different, and pivot axes could be combined in a single mechanism, such as a universal joint. Similarly, while the vertical locking pin is a convenient mechanism to selectively prevent the yaw motion, other known locking or keying mechanisms could be used.

As was mentioned above, the wheels 36 are convertible from a locked position, in which they do not caster, to a castering position. As shown in FIGS. 8–14, above each wheel 36 mounts on a vertical tubing member 60, which is fixed to the frame 34, preferably by welding. Mounted on each wheel 36 is a wheel mounting fork 62, which includes a vertical stem 64 and inner and outer legs 66, shown best in FIGS. 8, 10A, and 10B. The inner and outer legs 66 of the mounting fork 62 are mounted to the wheel 36 by means of an axle 68. The vertical stem 64 has a non-circular cross-section upper portion 70 (in this case hexagonal), which is used to lock the wheel against castering, as will be described below. There is a horizontal hole 72 in the upper portion of the stem 64. The stem 64 of the mounting fork 62 is received in a bushing 74 in the vertical tubing member 60.

The bushing 74 receives the circular cross-section stem 64 of the wheel mounting fork 62, with the non-circular cross-section upper portion 70 projecting out above the tube 60. The upper portion of the tube 60 has cut-out sections 78, which define upwardly-projecting legs 79 that are used to lock the wheel against castering, as will be described below.

Figure 8:
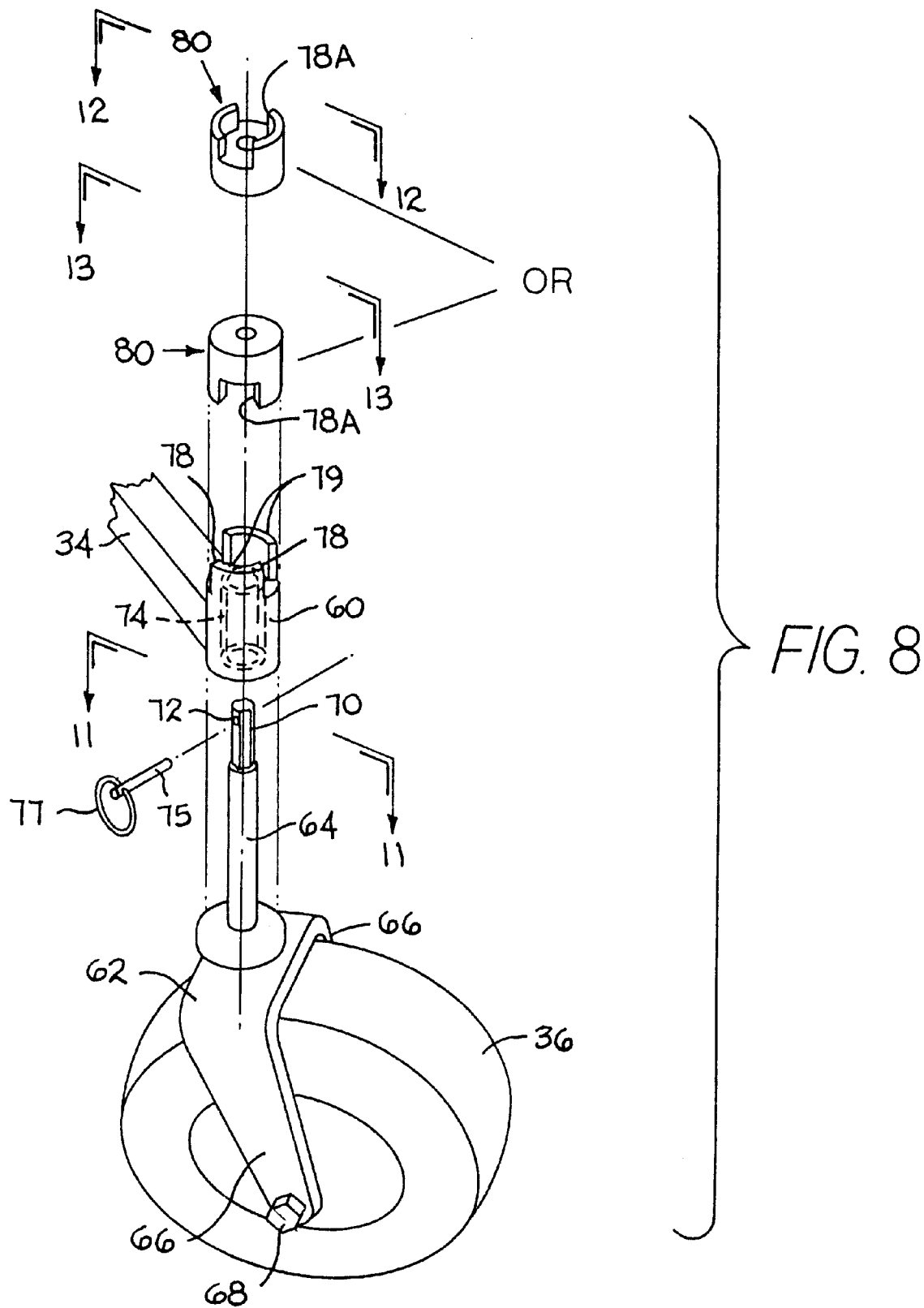
FIG. 8 is an exploded perspective view of one of the casters of FIG. 1, which can be permitted to caster or can be locked against castering.
Figure 10A:
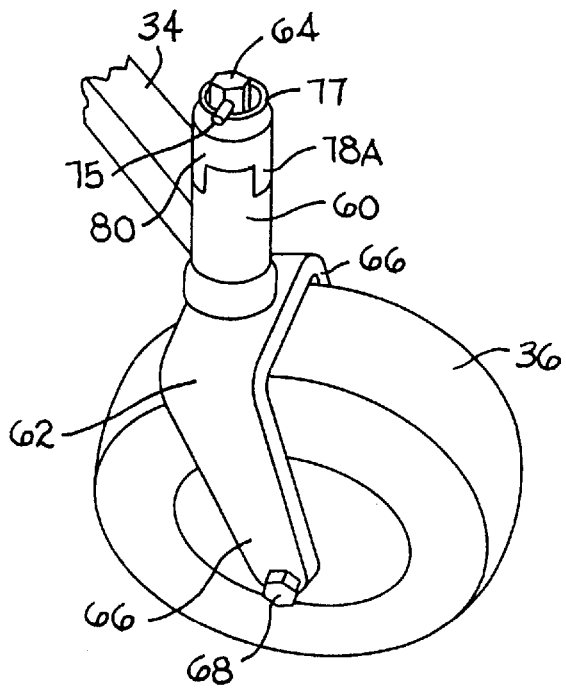
FIG. 10A shows the caster of FIG. 8 in the locked position.
Figure 10B:
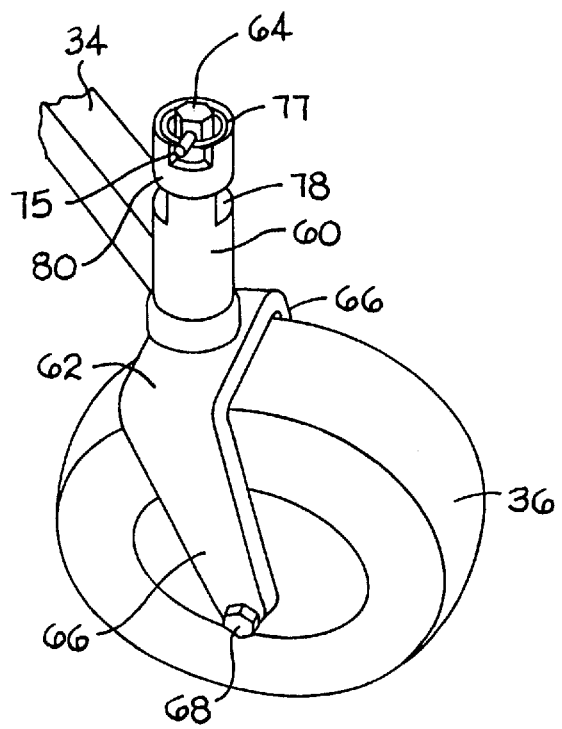
FIG. 10B shows the caster of FIG. 8 in the castering position.
Figure 11:
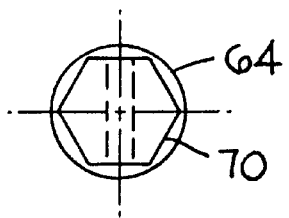
FIG. 11 is a view taken along the line 11—11 of FIG. 8 and shows the shaft of the caster.
Figure 12:
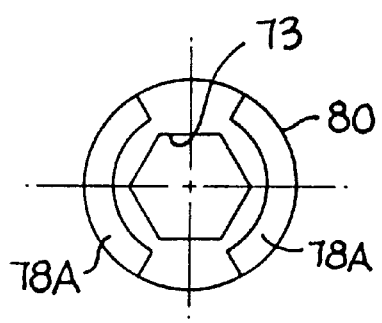
FIG. 12 is a view taken along the line 12—12 of FIG. 8 and shows the top of the locking collar when it is in the unlocked position.
Figure 14:
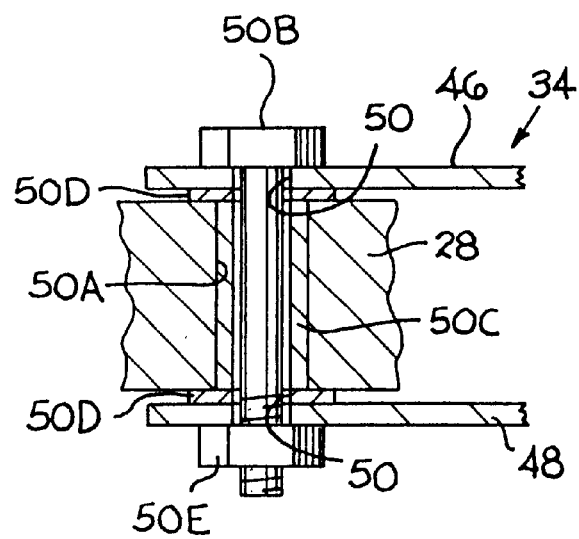
FIG. 14 is a view taken along the line 14—14 of FIG. 6, showing the vertical pivot axis.
Figure 13:
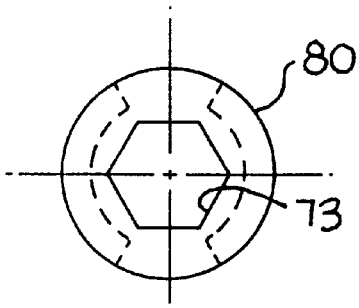
FIG. 13 is a view taken along the line 13—13 of FIG. 8 and shows the top of the locking collar when it is in the locked position.

A locking collar or key 80, shown in FIGS. 8, 12, and 13 can be used to lock the stem 64 and the tube 60 together. If the locking collar 80 is installed in one direction (as shown in FIG. 10A), it prevents the stem 64 from rotating relative to the tube 60, and, if it is turned over and installed in the opposite direction (as shown in FIG. 10B), it permits the stem 64 to rotate relative to the tube 60. As shown in FIG. 12, the locking collar 80 has a generally cylindrical shape. It defines a non-circular (hexagonal) opening 73, sized to receive the non-circular (hexagonal) upper stem portion 70, so that, when the upper stem portion 70 is received in the locking collar 80, the locking collar 80 and stem 64 are fixed together against relative rotation. The lower portion of the locking collar 80 defines downwardly-projecting legs 78A, that are sized to fit into the cut-out sections 78 between the upwardly-projecting legs 79 of the tube 60. When the locking collar or key 80 is inserted with its legs 78A down, as shown in FIG. 10A, the legs 78A of the collar 80 fit into the cut-out sections 78 of the tube 60, so that the collar will not rotate relative to the tube 60, and the non-circular internal cross-section 73 of the collar 80 cooperates with the non-circular cross-section of the upper stem portion 70, so the stem 64 does not rotate relative to the collar 80. This locks the stem 64 against rotation relative to the tube 60, so, in this position, the wheel 36 does not caster.

If the locking collar 80 is turned upside down and installed as shown in FIG. 10B, then the upper stem portion 70 again is received in the opening 73, with the noncircular cross-section of the upper stem 70 and the non-circular cross-section of the opening 73 causing the collar 80 and stem 64 to be fixed together, and the collar 80 rests on the top of the legs 79 of the tube 60 without locking against the tube 60. In this position, the stem 64 and collar 80 will rotate relative to the tube 60, and the wheel 36 will caster. A pin 75 is received in the hole 72 of the upper stem portion 70, which projects above the locking collar 80, to retain the locking collar 80 in position both in the locking position, shown in FIG. 10A, and in the castering position, shown in FIG. 10B. There is a pivot ring 77 on the pin 75, which, once the pin 75 is inserted, is pivoted up and over the top of the stem 64, preventing the pin 75 from accidentally falling off of the stem 64.

This method of locking or keying the stem 64 and tube 60 together is simply one example of a locking or keying mechanism. Various other keying or locking mechanisms could be used that would also be easy to change from a castering to a non-castering mode.

It is expected that, when the locking pin 52B is removed, so the standing platform 32 can pivot about the vertical hinge pin 50B, the wheels 36 will be locked against castering, and, when the locking pin 52B is inserted, to prevent the standing platform from rotating about a vertical axis relative to the vehicle 5, then the wheels 36 will be adjusted to the position shown in FIG. 10B, to permit them to caster.

It will be obvious to those skilled in the art that modifications may be made to the embodiment described above without departing from the scope of the present invention.

What is claimed is:

1. A sulky for use behind a self-propelled vehicle, comprising:
    a mounting bracket;
    a connecting arm mounted to the mounting bracket so as to permit the connecting arm to pivot about a first pivot axis relative to the mounting bracket;
    a coupler pivotably mounted to the connecting arm for pivoting about a second pivot axis;
    a platform pivotably mounted to the coupler so as to pivot about a third pivot axis; wherein said three pivot axes provide for pitch, roll, and yaw motion; and
    aligned locking holes at one of the foregoing mounts and a locking pin receivable in said aligned locking holes to prevent pivoting at that mount, whereby the user may remove the pin in order to provide for pivoting about three axes and may insert the pin to restrict pivoting to two axes.

2. A sulky for use behind a self-propelled vehicle, comprising:
    a platform;
    at least one wheel supporting said platform;
    a mounting linkage mounted to said platform, including a mounting bracket adapted to be fixed to the self-propelled vehicle, wherein said mounting linkage permits pitch and yaw motion between said platform and the vehicle; and a first locking mechanism which, when engaged, locks said mounting linkage so as to prevent the yaw motion.

3. A sulky as recited in claim 2, and further comprising a second wheel porting said platform, and wherein said mounting linkage also permits roll motion between said platform and the vehicle.

4. A sulky as recited in claim 2, wherein said wheel is a caster wheel, and further comprising a second locking mechanism which, when engaged, prevents said wheel from castering.

5. A sulky as recited in claim 3, wherein said mounting linkage further comprises a frame, on which said platform and said two wheels are mounted; each of said wheels including an upwardly-projecting stem; and said frame including tubes which receive said stems; and further comprising a second locking mechanism, which, when engaged, prevents one of the stems from pivoting relative to its respective tube, and, when disengaged, permits said one stem to pivot relative to its respective tube so that the respective wheel can caster.

6. A sulky as recited in claim 5, wherein said mounting linkage further comprises an arm mounted to said bracket by a left-to-right-directed pin so as to permit the arm to pivot about the left-to-right horizontal axis relative to said bracket.

7. A sulky as recited in claim 6, wherein said mounting linkage further comprises a connecting shaft, and wherein said arm has a forward-to-rear-directed receptacle that receives said connecting shaft so as to permit the platform to pivot about a horizontal, front-to-rear axis relative to said bracket to provide roll motion.

8. A sulky as recited in claim 7, wherein said connecting shaft has a portion defining forward and rear vertical holes; and wherein said frame includes a portion defining forward and rear vertical holes aligned with the forward and rear vertical holes of said connecting shaft; a forward pin received in said aligned forward holes in said frame portion and said connecting shaft, and a rear pin received in said aligned rear holes in said frame portion and said connecting shaft, wherein, when both said forward and rear pins are in their respective holes said platform is locked against pivoting about a vertical axis relative to the vehicle through said linkage, and, when one of said forward and rear pins is removed, said platform can pivot about the vertical axis of the other of said pins relative to the vehicle.

9. A sulky, comprising:
    a platform;
    first and second caster wheels supporting said platform;
    a forward-to-rear-directed connecting shaft mounted to said platform through a vertical pivot pin to provide yaw motion;
    a connecting arm mounted to said forward-to-rear-directed connecting shaft so as to pivot about a forward-to-rear axis relative to said platform to provide roll motion;
    a bracket mounted to said connecting arm to permit pivoting about a left-to-right horizontal axis between said platform and the vehicle to provide pitch motion; and
    a second vertical pin and a pair of cooperating holes, one cooperating hole fixed to said connecting shaft the other cooperating hole fixed relative to said platform, wherein, when said second vertical pin is inserted through said pair of cooperating holes, it prevents said platform from pivoting about a vertical axis relative to said connecting shaft.

10. A sulky as recited in claim 9, wherein each of said caster wheels includes a vertical stem; and further comprising two tubes fixed relative to said platform which receive said respective vertical stems; and a pair of keys, each key releasably locking one respective vertical stem to its respective tube to prevent castering of its respective wheel.

11. A sulky as recited in claim 1, and further comprising means for limiting the amount of roll.

12. A sulky as recited in claim 8, and further comprising means for limiting the amount of roll.

13. A sulky as recited in claim 9, and further comprising means for limiting the amount of roll.

14. A sulky as recited in claim 1, and further comprising means for limiting the amount of pitch.

15. A sulky as recited in claim 8, and further comprising means for limiting the amount of pitch.

16. A sulky as recited in claim 9, and further comprising means for limiting the amount of pitch.

17. A sulky as recited in claim 1, and further comprising means for limiting the amount of yaw.

18. A sulky as recited in claim 8, and further comprising means for limiting the amount of yaw.

19. A sulky as recited in claim 9, and further comprising means for limiting the amount of yaw.

20. A sulky for use behind a self-propelled vehicle, comprising:

a platform;

at least one wheel supporting said platform;

a mounting linkage mounted to said platform, defining three axes of rotation, for providing pitch, roll, and yaw of the platform relative to the vehicle, each of said axes of rotation including a cylindrical member and a body that rotates about the cylindrical member, and further comprising at least one stop limiting the amount of rotation about the cylindrical member;

wherein said stop includes a pin extending through one of the body and the cylindrical member perpendicular to the axis of rotation and a stop portion of the other of the body and the cylindrical member, wherein, as the body rotates, the pin comes into contact with the stop portion, thereby limiting the amount of rotation of the body about the cylindrical member.

21. A sulky as recited in claim 20, wherein said pin is mounted on a first member and said stop comprises a contact point between the first member and the body.

* * * * *

UNITED STATES PATENT AND TRADEMARK OFFICE
CERTIFICATE OF CORRECTION

PATENT NO       : 6,145,855

DATED            : November 14, 2000

INVENTOR(S)    : William B. Bellis, Jr.

It is certified that error appears in the above-identified patent and that said Letters Patent is hereby corrected as shown below:

Claim 3, line 57, delete "porting" and insert therefor –supporting–.

Signed and Sealed this

Eighth Day of May, 2001

*Attest:*

NICHOLAS P. GODICI

*Attesting Officer*      *Acting Director of the United States Patent and Trademark Office*